United States Patent
Gaudlip

(10) Patent No.: US 10,007,559 B1
(45) Date of Patent: Jun. 26, 2018

(54) VIRTUAL TIERING

(71) Applicant: EMC Corporation, Hopkinton, MA (US)

(72) Inventor: Christopher James Gaudlip, Plano, TX (US)

(73) Assignee: EMP IP Holding Company LLC, Hopkinton, MA (US)

( * ) Notice: Subject to any disclaimer, the term of this patent is extended or adjusted under 35 U.S.C. 154(b) by 622 days.

(21) Appl. No.: 14/032,286

(22) Filed: Sep. 20, 2013

(51) Int. Cl.
*G06F 9/50* (2006.01)
*H04L 12/24* (2006.01)

(52) U.S. Cl.
CPC .......... *G06F 9/5077* (2013.01); *G06F 9/5027* (2013.01); *H04L 41/5054* (2013.01)

(58) Field of Classification Search
CPC ............................ G06F 9/5077; H04L 41/5054
See application file for complete search history.

(56) References Cited

U.S. PATENT DOCUMENTS

| | | | |
|---|---|---|---|
| 7,752,623 B1 * | 7/2010 | Crawford, Jr. .......... | G06F 9/505 718/1 |
| 7,941,804 B1 * | 5/2011 | Herington ............. | G06F 9/5077 712/13 |
| 2005/0044301 A1 * | 2/2005 | Vasilevsky .......... | G06F 9/45533 711/1 |
| 2006/0195715 A1 * | 8/2006 | Herington ............. | G06F 9/5077 714/4.2 |
| 2010/0088150 A1 * | 4/2010 | Mazhar ................. | G06F 9/5088 717/120 |
| 2011/0314069 A1 * | 12/2011 | Alatorre ............ | G06F 17/30082 707/827 |
| 2013/0311778 A1 * | 11/2013 | Cherukuri ........... | H04L 63/0272 713/171 |
| 2013/0332614 A1 * | 12/2013 | Brunk ................. | H04L 67/1097 709/226 |
| 2014/0337837 A1 * | 11/2014 | Padala .................. | G06F 9/5072 718/1 |

* cited by examiner

*Primary Examiner* — Aaron Strange
(74) *Attorney, Agent, or Firm* — Krishnendu Gupta; Robert Kevin Perkins

(57) ABSTRACT

A computer-executable method, system, and computer program product for allocating resources to an application of a set of applications, wherein the virtualized resources are grouped into tiers based on the performance characteristics of the virtualized resources, the computer-executable method comprising, monitoring resource demand of an application of the set of applications; wherein the resources allocated to the application are from a first tier of the tiers, making a determination whether to allocate to the application a portion of the resources from a different tier of the tiers, based on a positive determination, allocating the portion from the different tier of the tiers.

20 Claims, 15 Drawing Sheets

|  | BRONZE 750 | SILVER 760 | GOLD 770 |
|---|---|---|---|
| RAM 720 | 40% | 40% | 20% |
| CPU 730 | 50% | 10% | 40% |
| FAST PASS 740 | NO | NO | YES |

FIG. 7

| RAM ALLOCATION | | | | | |
| --- | --- | --- | --- | --- | --- |
| APPLICATION | AVERAGE DEMAND (MB) | PEAK DEMAND (MB) | ALLOCATION (MB) | | |
| | | | BRONZE | SILVER | GOLD |
| APP. 1 | 70 | 90 | 70 | 10 | 10 |
| APP. 2 | 45 | 45 | 45 | 0 | 0 |

| RAM ALLOCATION SCHEDULER > APPLICATION 1 | | | | | |
|---|---|---|---|---|---|
| TIME SLOT | AVERAGE DEMAND (MB) | PEAK DEMAND (MB) | ALLOCATION (MB) | | |
| | | | BRONZE | SILVER | GOLD |
| 6:00 AM - 11:59 AM | 55 | 60 (9:30 AM) | 55 | 0 | 5 |
| 12:00 PM - 5:59 PM | 70 | 75 (1:00 PM) | 55 | 15 | 10 |
| 6:00 PM - 11:59 PM | 85 | 90 (8:54 PM) | 55 | 15 | 20 |
| 12:00 AM - 5:59 AM | 5 | 10 (5:45 AM) | 10 | 0 | 0 |

FIG. 9

| SYSTEM ALLOCATION SCHEDULE VIEWER > APPLICATION 1 | | | | | | | | | |
|---|---|---|---|---|---|---|---|---|---|
| TIME SLOT | RAM ALLOCATION (MB) | | | CPU ALLOCATION (GHz) | | | FASTPASS ALLOCATION | | |
| | B | S | G | B | S | G | B | S | G |
| 6:00 AM - 11:59 AM | 55 | 0 | 5 | 5 | 0 | 0 | - | - | - |
| 12:00 PM - 5:59 PM | 55 | 15 | 10 | 5 | 4 | 0 | - | X | - |
| 6:00 PM - 11:59 PM | 55 | 15 | 20 | 5 | 5 | 2 | - | - | X |
| 12:00 AM - 5:59 AM | 10 | 0 | 0 | 10 | 0 | 0 | - | - | - |

| | ITEM | DESCRIPTION | PRICE |
|---|---|---|---|
| RAM | MB RAM (GOLD) | HIGH-SPEED RAM | $3/MB |
| | MB RAM (SILVER) | AVERAGE RAM | $2/MB |
| | MB RAM (BRONZE) | ECONOMICAL RAM | $1/MB |
| CPU | GHz CPU (GOLD) | HIGH-PERFORMANCE CPU | $30/GHz |
| | GHz CPU (SILVER) | AVERAGE CPU | $20/GHz |
| | GHz CPU (BRONZE) | ECONOMICAL CPU | $10/GHz |
| FAST PASS | FAST PASS (GOLD) | EXTREME PERFORMANCE BOOST | $50 |
| | FAST PASS (SILVER) | MODERATE PERFORMANCE BOOST | $40 |
| | FAST PASS (BRONZE) | MILD PERFORMANCE BOOST | $25 |

| ITEM<br>1320 | PRICE<br>1330 | COST<br>1340 |
|---|---|---|
| 24 MB RAM (GOLD) | $3/MB | $72 |
| 40 MB RAM (SILVER) | $2/MB | $80 |
| 53 MB RAM (BRONZE) | $1/MB | $53 |
| 4 GHz CPU (GOLD) | $30/GHz | $120 |
| 1 GHz CPU (SILVER) | $20/GHz | $20 |
| 5 GHz CPU (BRONZE) | $10/GHz | $50 |
| FAST PASS (GOLD) | $50 | $50 |
| FAST PASS (SILVER) | $40 | $40 |
| FAST PASS (BRONZE) | $25 | $25 |
| TOTAL | | $510 |

FIG. 13

VIRTUAL TIERING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to virtualization.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for allocating resources to an application of a set of applications, wherein the virtualized resources are grouped into tiers based on the performance characteristics of the virtualized resources, the computer-executable method comprising, monitoring resource demand of an application of the set of applications; wherein the resources allocated to the application are from a first tier of the tiers, making a determination whether to allocate to the application a portion of the resources from a different tier of the tiers, based on a positive determination, allocating the portion from the different tier of the tiers.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 7 is an example embodiment of a compute resource allocation policy for the virtual computer shown in FIG. 6, in accordance of an embodiment of the present disclosure; and FIG. 8 is a simplified illustration of a User Interface (UI) to view and/or modify RAM allocation policies, in accordance of an embodiment of the present disclosure;

FIG. 9 is a simplified illustration of a UI to view and/or modify RAM allocation policies on a time schedule, in accordance of an embodiment of the present disclosure;

FIG. 10 is a simplified illustration of a UI to view or modify allocation policies for RAM, CPU, and Fast Pass layers on a time schedule, in accordance of an embodiment of the present disclosure;

FIG. 12 is a simplified illustration of a service catalog, in accordance of an embodiments of the present disclosure;

FIG. 13 is a simplified illustration of an itemized bill, in accordance of an embodiment of the present disclosure;

DETAILED DESCRIPTION

Figure 1:
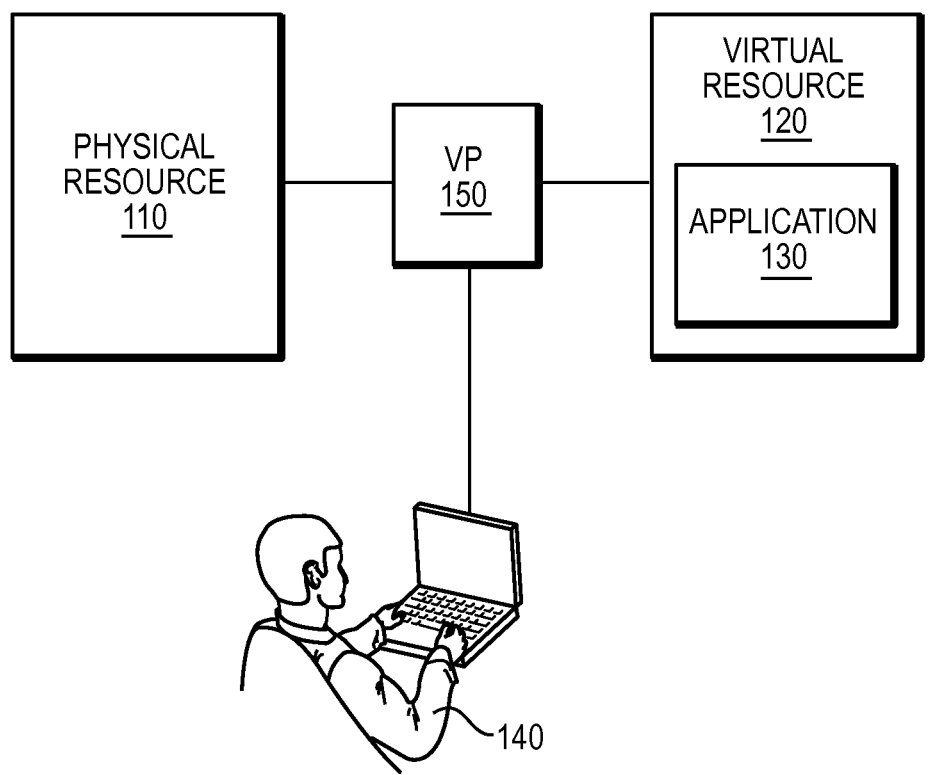
FIG. 1 is a simplified illustration of a virtualized system, in accordance with an embodiment of the present disclosure.

Traditionally, resource provisioning involves allocating devices and or resources for use by an application. Normally, users provide maximum resource requirements for each respective application, or use, which may include current and future requirements. Usually, allocating resources for future requirements means that powerful and expensive resources may be taken or reserved from the total amount of usable resources even though a portion of the resource may be unutilized. As such, traditional implementations may be problematic as they often lead to inefficient use of resources, as both current and future resource requirements are taken into account. Conventionally, resources cannot be "scaled down" once they have been appropriated or reserved. Traditionally, a challenge associated with virtual computing is the need to carefully monitor the usage of virtually provisioned computer resources to ensure that no resource is overburdened during peak computer processing. Usually, businesses must communicate about resources in very specific and technical terms referring to the physical specifications of the hardware.

In some embodiments, the present disclosure may enable efficient management of computer capability by allocating computer performance on an "as needed" basis. In further embodiments, the present disclosure may enable a system to give the illusion that it has more performance capability than may be physically provided. In other embodiments, computer capability may be allocated when a pre-set requirements exists, rather than during the initial configuration of a system.

In certain embodiments, the present disclosure may enable a customer to drive down costs by reducing consumption of resources that are not being used efficiently. In some embodiments, the present disclosure may enable creation of a managed service that is sold as a subscription. In other embodiments, more resource capability may be provided to a customer than may be immediately required. In further embodiments, a customer may be enabled to dynamically access more and/or better performing resources on-demand. In some embodiments, the present disclosure may enable improved resource demand management. In certain embodiments, resource management may be optimized to support growth by providing the capability to automatically increase available resources in real time. In some embodiments, the current disclosure may enable reduction of power and cooling costs by lowering or reducing the amount of idle devices. In further embodiments, the present disclosure may enable standardization and overall efficiency with respect to use of resources. In other embodiments, the present disclosure may enable business to become a part of green computing initiatives In some embodiments, the present disclosure may enable a business to ensure through active resource management that optimum processing may be maintained. In other embodiments, active resource management may be accomplished through use of integrated monitoring tools.

In certain embodiments, resources may be virtualized using a virtualization platform (VP). In other embodiments, applications may consume resources presented by a VP. In some embodiments, virtualized environments may require a VP, such as a hypervisor, to manage a virtual machine (VM) environment. In certain embodiments, a Type 1 hypervisor may be a hardware-based VP for computer resources and a Type 2 hypervisor may be a software-based VP for computer resources. In further embodiments, a VP may be a Type 1 hypervisor such as those used in VMWare ESX/ESXi, Oracle VM Server, or Citrix XenServer. In other embodiments, a VP may be a Type 2 hypervisor such as those used in VMWare Workstation or VirtualBox. In some embodiments, applications may be one or more computer applications which may be processed on one or more VMs. In further embodiments, applications may be individual VMs, such as virtual computers or virtual servers. In other embodiments, applications may be individual processes irrespective of a particular VM. In some embodiments, the VP may run on top of a physical server's operating system (OS), and may be referred to as a host OS. In certain embodiments, a VM may be created within a VP. In other embodiments, each VM may run a guest OS with CPU, memory, hard disk, and network resources that may be managed by a VP. In further embodiments, the number of VP hosts, VMs, CPU count and speed, RAM, clock frequency, cache, cores, QPI, and DIMM clock speeds assigned to a virtual computing environment may vary with performance requirements. In some embodiments, a virtualization layer may comprise VPs, virtual resources, virtual machines, and/or applications.

In other embodiments, the techniques of the present disclosure may be applied to networks, big data, or data bases. In further embodiments, the VP may be a virtual network manager and the applications may be virtualized networking devices. In still other embodiments, the VP may be a virtual data base manager and the application may be a virtualized data base.

In still other embodiments, the present disclosure may enable creation of policies to manage computer resources within a computer solution. In various embodiments, a policy may be defined by a vendor and a customer to create a cost-effective computer solution with a dynamic ability to change along with the needs of the customer, thereby reducing overall cost. In some embodiments, the present disclosure may enable a system to allocate computer performance for one or more layers. In certain embodiments, a layer may be a device, component, or functionality that is virtualized. In some embodiments, computer resources in an environment may consist of one or more of the following layers: CPU count, CPU speed, RAM subsystem size, and/or "Fast Pass" performance boost. In various embodiments, Fast Pass performance boost may utilize technology to increase overall performance of resources, or underlying infrastructure such as clock frequency, cores, interconnect transfers, and memory module clock speeds. In some embodiments, the present disclosure may enable a customer to choose CPU count and speed, RAM size and infrastructure that meet the customer's performance needs weighed against their financial constraints. In certain embodiments, performance needs and financial constraints may fluctuate in importance over time, such as daily, monthly, quarterly, or yearly. In further embodiments, the present disclosure may enable the creation of a set of policies that may take into account varying needs of a customer to dynamically and/or automatically vacillate between resource tiers to consistently meet the most pressing of requirements.

In certain embodiments, a customer may require more computer resources during peak season and less computer resources during off season, but may need to maintain a consistent rate of processing through the entire year. In further embodiments, a customer may be able to process business requests at the same rate regardless of which season the request is received. In other embodiments, the present disclosure may enable the customer to set policies to address seasonal computer resource needs dynamically and/or automatically.

In some embodiments, a service catalog may be a catalog of resources or services available for purchase by a business. In further embodiments, service catalogs may describe or offer services or resources in business terms. In certain embodiments, service catalogs may be tailored to the specific business, service level, or speed to market requirement of a line of business (LOB). In other embodiments, service catalogs may describe common IT services needed by businesses where the descriptions are detached from the underlying technology decisions. In certain embodiments, industry standard terms may be used to purchase resources. In some embodiments, CPU GHz may be a unit that corresponds to a number of operations processed by a CPU and may be unrelated to the common definition of CPU GHz as a particular processor speed. In further embodiments, MB RAM may be a unit which corresponds to a number of memory transactions and may be unrelated to the common definition of MB RAM as a memory capacity. In other embodiments, resources billed in CPU GHz may correspond to the cost to perform a number of processor operations. In certain embodiments, resources billed MB RAM may correspond to the cost to perform a number of memory transactions. In various embodiments, the present disclosure may enable the billing of CPU GHz, MB RAM, Fast Pass, and other resources according to the amount of resources actually utilized within a billing cycle. In further embodiments, resources may be billed based on the tier of the resources used and the workload accomplished using those resources. In other embodiments, businesses may be enabled to purchase service for a specific quantity of applications or VMs.

In some embodiments, tiered service categories may balance computer resource performance and cost targets relative to the business criticality of each application. In certain embodiments, criticality may be an attribute of an application which may be determined by the acceptable performance of that application. In other embodiments, an application may be noncritical if transactional delays or service failures are tolerable. In some embodiments, an application may be critical if swift and/or reliable performance is required. In other embodiments, there may be multiple levels of criticality that may be defined by various performance requirements.

In further embodiments, LOBs may gain ease and flexibility from simplified, normalized service level requests. In certain embodiments, the present disclosure may enable businesses to communicate in business terms about highly technical resources. In other embodiments, automated policy driven tiering may allow businesses to rapidly adjust between tiers. In some embodiments, automated policy driven tiers may allow for more granular control of the computer resource tier allocation for specific applications.

Virtual Tiering

In some embodiments, virtual tiering may enable LOBs to greatly reduce floor space and power consumption of resources. In further embodiments, virtual tiering may lower overall environmental impacts of resources. In other embodiments, virtual tiering may enable LOBs to have policy-driven control of computer resource allocation for specific applications based on business and performance requirements.

In other embodiments, businesses implementing virtual tiering may continually monitor performance and computer resources between tiers to maximize performance. In further embodiments, businesses may implement policies which may be defined by the LOBs for specific applications based on their criticality and performance requirements. In still further embodiments, the policies may govern the maximum percentage which each application can allocate to each tier of computer resources. In some embodiments, policies may enable the business to control the performance/cost equation based on business priorities, while enabling optimum performance to be achieved. In certain embodiments, virtual tiering may help to optimize total cost of ownership. In some embodiments, resources may be sold as a service rather than an acquisition. In other embodiments, virtual tiering may be policy driven and allow for more granular control of the computer tier allocation for specific applications. In some embodiments, LOB applications may be assigned to a virtual tier based on its performance requirements. In certain embodiments, virtual tiering may enable workloads to be automatically distributed across the available tiers allowed by the policy-specified distribution.

Refer now to the example embodiment of FIG. 1. FIG. 1 is a simplified illustration of a virtualized system. Physical resource 110 is virtualized by VP 150 into virtual resource 120. Application 130 consumes resources via virtual resource 120. In this embodiment, user 140 interacts with VP 150. In many embodiments, one or more applications may be enabled to consume resources through a virtual resource. In some embodiments, physical resources may be virtualized into multiple virtual resources.

Figure 2:
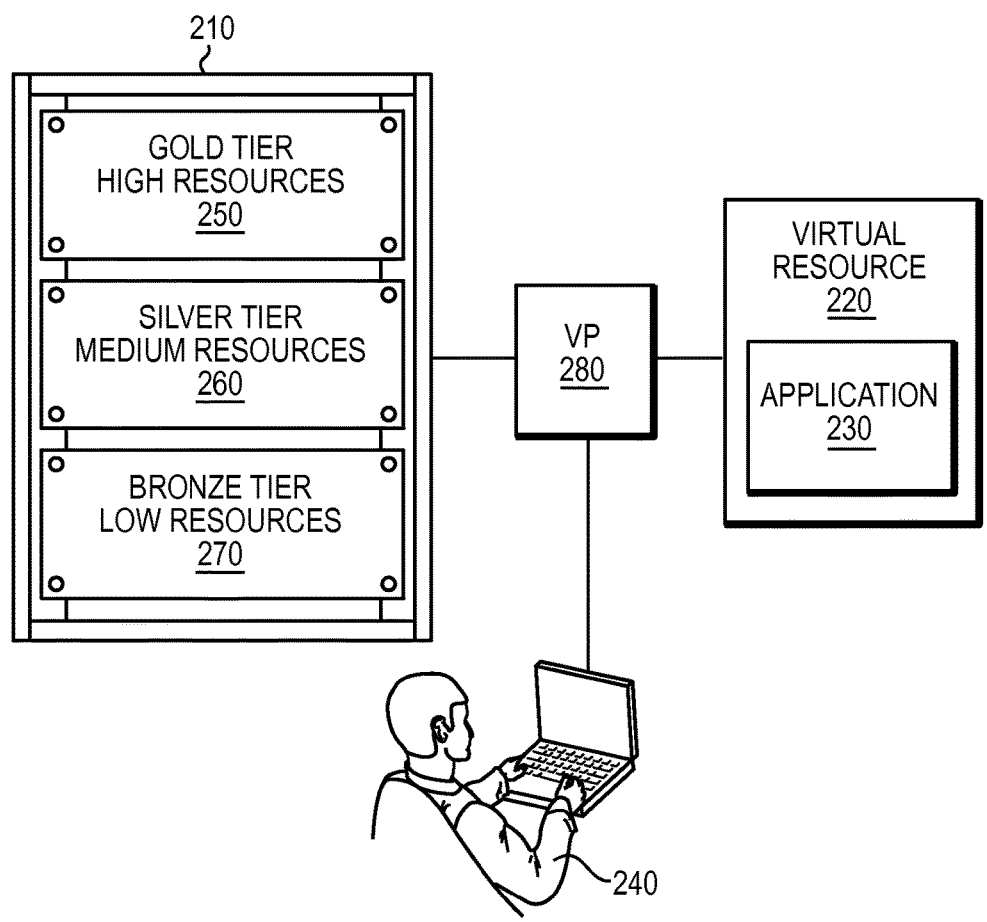
FIG. 2 is a simplified illustration of a virtualized system with tiered resources, in accordance of an embodiment of the present disclosure.

Refer now to the example embodiment of FIG. 2. FIG. 2 is a simplified illustration of a virtualized system with tiered resources. Each device in resource set 210 is assigned to a tier of resources based on characteristics of each resource. In this embodiment, resources with relatively high performance characteristics are assigned to Gold Tier 250. Resources with medium performance characteristics are assigned to Silver Tier 260. Resources with low performance characteristics are assigned to Bronze Tier 270. In this embodiment, application 230 consumes the resources presented by virtual resource 220. VP 280 automatically allocates resources to virtual resource 220 to be consumed by application 230. In this embodiment, the VP 280 enables user 240 to monitor resource consumption.

Figure 3:
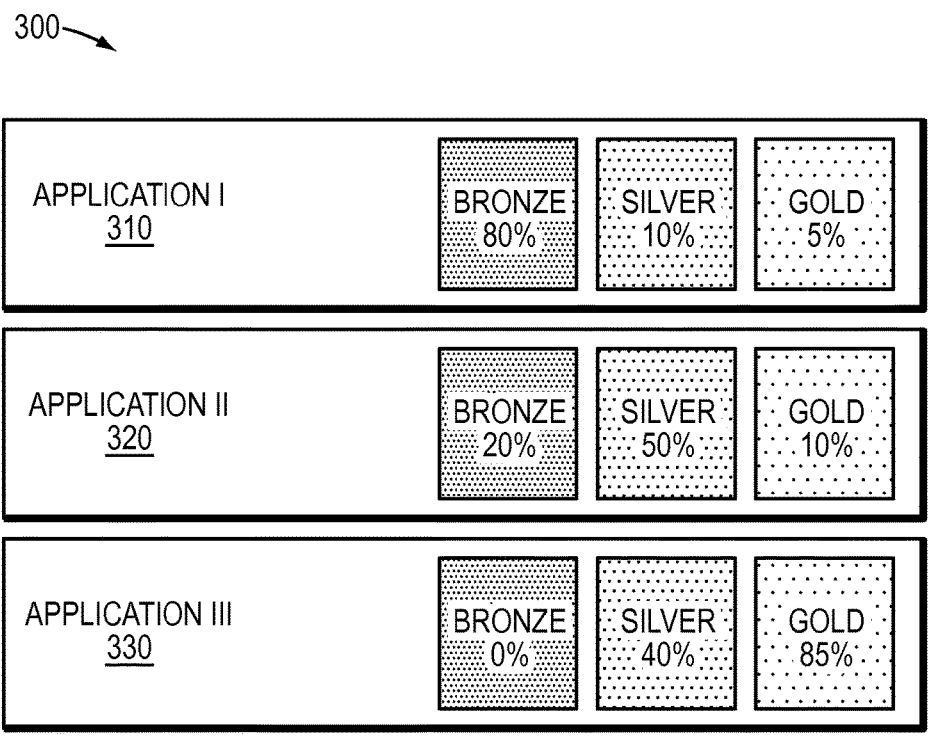
FIG. 3 is a simplified illustration of a resource allocation policy as implemented on the virtualized system of FIG. 2, in accordance of an embodiment of the present disclosure.

Refer now as well to the example embodiment of FIG. 3. The example embodiment of FIG. 3 is a simplified illustration of a resource allocation policy as implemented on the virtualized system of FIG. 2. FIG. 3 shows a set of applications 310, 320, 330. Application I 310 is a low criticality application; Application II 320 is a medium criticality application; Application II 330 is a high criticality application. Each application has a portion of resource tiers 250, 260, 270 allocated to it by policy 300. In this embodiment, applications with higher criticality tend to have higher tier resources allocated to them. In this embodiment, VP 280 is directed by policy 300 to allocate 80% of Bronze Tier resources 270 to Application I 310. VP 280 is directed by policy 300 to allocate the remaining 20% of Bronze Tier resources 270 to Application II 320. According to policy 300, VP 280 allocates no Bronze Tier resources 270 to Application III 330. As show in FIG. 3, policy 300 further directs VP 280 to allocate Silver Tier 260 and Gold Tier 250 resources to applications 310, 320, 330 according to the percentages indicated. The percentages for any tier that are allocated according to policy 300 will sum to 100%, indicating that all of the resources in each tier are fully utilized.

Figure 4:
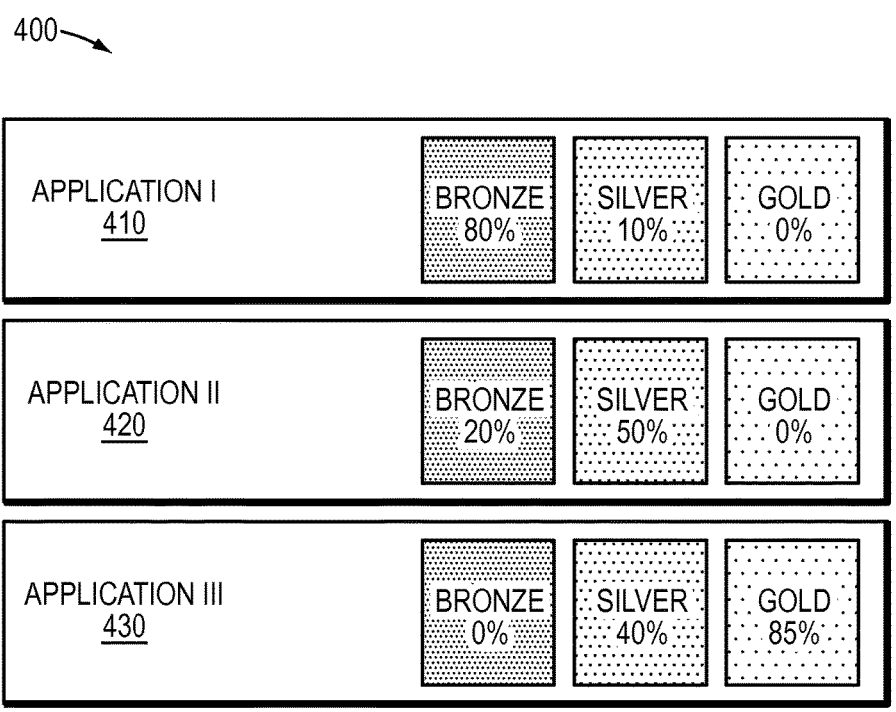
FIG. 4 is a simplified illustration of an alternative resource allocation policy as implemented on the virtualized system of FIG. 2, in accordance of an embodiment of the present disclosure.

Refer now as well to the example embodiment of FIG. 4. The example embodiment of FIG. 4 is a simplified illustration of an alternative resource allocation policy as implemented on the virtualized system of FIG. 2. Policy 400 is a resource allocation policy that may be used when a business or programmable logic determines that a portion of available resources are unneeded or unwanted. Policy 400 conserves resources that would be underutilized by not allocating those resources to be used by applications. Application III 430 uses gold tier resources 250. Applications I 410 and II 420 are not allocated Gold Tier resources 250. Gold Tier resources 250 are not fully utilized, thus the virtualized resource system may be more efficient and cost-effective.

Figure 5:
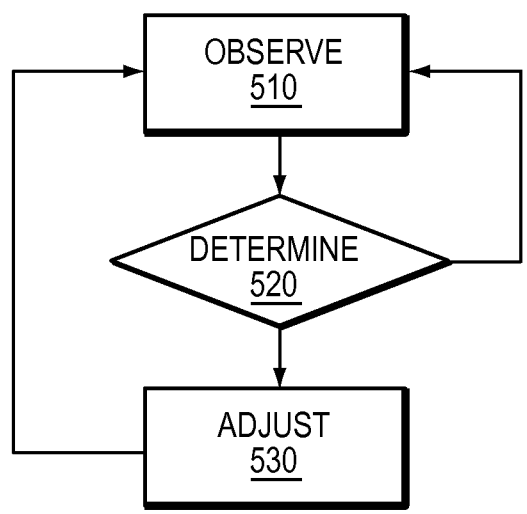
FIG. 5 is an example embodiment of a method of managing the logic of a Virtualization Platform (VP), in accordance of an embodiment of the present disclosure.

Refer now to FIG. 5 and FIG. 2. FIG. 5 is a simplified embodiment of a method of managing logic of a VP, as shown in FIG. 2. VP 280 observes application resource usage over a period of time (Step 510). VP 280 determines if the resources allocation policy should be adjusted (Step 520). Based on a negative determination, Step 510 is repeated. Based on a positive determination, VP 280 adjusts the resource allocation policy (Step 530). After adjustment, Step 510 is repeated. In many embodiments, by adjusting resource allocation policies, resources utilization may approach complete efficiency.

Figure 6:
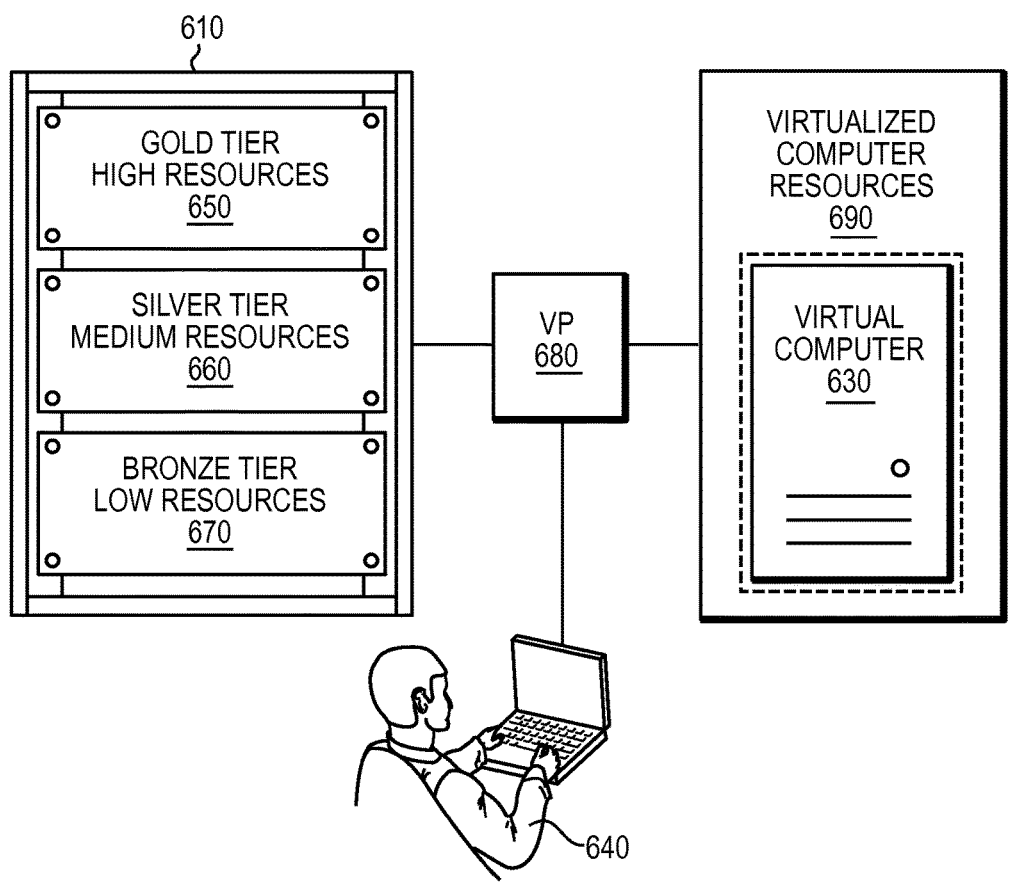
FIG. 6 is an example illustration of a virtual computing system, in accordance of an embodiment of the present disclosure.

Refer now to the example embodiment of FIG. 6. FIG. 6 is an example illustration of a virtual computing system. Computer resources 610 are assigned to Gold Tier 650, Silver Tier 660, and Bronze Tier 670 according to their performance characteristics. Virtualization platform 680 presents virtualized computer resource 690 to be consumed by virtual computer 630. Virtualization platform 680 is enabled to allocate a portion of the resources from a tier to be consumed by virtual computer 850 according to a policy. User 640 interacts with virtualization platform 680. In many embodiments, a virtualization platform may be further enabled to allocate resources for use by multiple virtual computers or virtual machines.

Refer to the example embodiments of FIG. 7 and FIG. 6. FIG. 7 is an example embodiment of a computer resource allocation policy for the virtual computer shown in FIG. 6. Policy 710 directs hypervisor 680 to allocate computer resources 610 to Virtual Computer 630. In this embodiment, RAM policy 720 allocates Gold Tier resources 650 to the top 20% of its workload, Bronze Tier resources 670 to the bottom 40% of its workload, and Silver Tier resources 660 to middling 40% of its workload. CPU Policy 730 allocates CPU resources to the workload of Virtual Computer 630. Fast Pass Policy 740 allocates Fast Pass resources to the workload of Virtual Computer 630. In this embodiment, Fast Pass Policy 740 directs hypervisor 680 to provide Gold Tier fast pass resources to Virtual Computer 630.

Refer now to the example embodiment of FIG. 8. FIG. 8 is a simplified illustration of a User Interface (UI) to view and/or modify RAM allocation policies. UI 810 displays information about RAM usage of an application. The information displayed by UI 810 may be historical, current, and/or predictive. UI 810 displays the current allocation policy for RAM for an application.

Refer now to the example embodiment of FIG. 9. FIG. 9 is a simplified illustration of a UI to view and/or modify RAM allocation policies on a time schedule. UI 910 breaks a 24-hour period into four 6 hour blocks and displays information and the allocation policy for those blocks. In other embodiments, the time distribution may be displayed seasonally, monthly, daily, or continuously.

Refer now to the example embodiment of FIG. 10. FIG. 10 is a simplified illustration of a UI to view or modify allocation policies for RAM, CPU, and Fast Pass layers on a time schedule. UI 1010 breaks a 24-hour period into four 6 hour blocks, and displays the allocation policies for those blocks. UI 1010 displays the RAM allocation policy for Bronze, Silver and Gold tier RAM in MB and the CPU allocation policy for Bronze, Silver, and Gold tier CPU in GHZ. UI 1010 displays the Fast Pass allocation policy as enabled or disabled for Bronze, Silver, and Gold tier Fast Pass. In other embodiments, the time distribution may be displayed seasonally, monthly, daily, or continuously.

Figure 11:
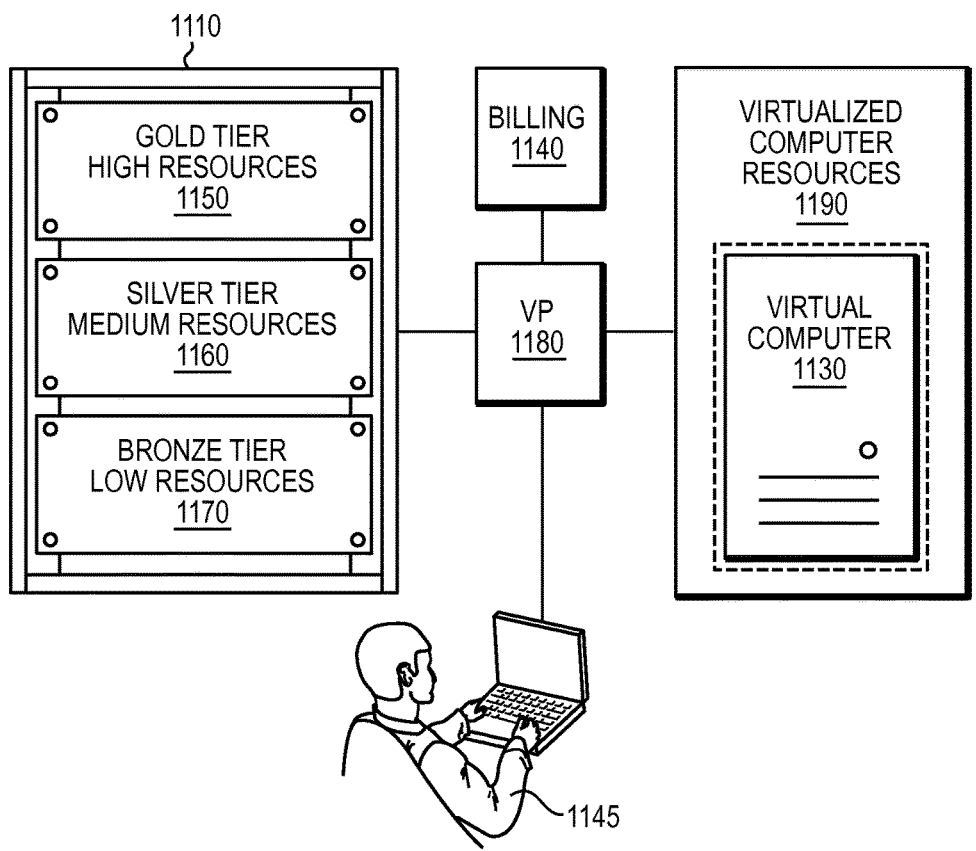
FIG. 11 is a simplified illustration of the virtual computing system with a billing module, in accordance of an embodiment of the present disclosure.

Refer now to the example embodiment of FIG. 11. FIG. 11 is a simplified illustration of the virtual computing system of FIG. 6 with a billing module. In FIG. 11, computer resources 1110 include Gold Tier resources 1150, Silver Tier resources 1160, and Bronze Tier resources 1170. Hypervisor 1180 presents virtualized computer resources 1190 to Virtual Computer 1130. Billing module 1140 collects information on resources allocated by hypervisor 1180 for consumption by Virtual Computer 1130. In this embodiment, billing module 1140 outputs an invoice according to a billing schedule based on the usage of virtualized computer resources 1190.

Refer to the example embodiment of FIG. 12. FIG. 12 is a simplified illustration of a service catalog. Service catalog 1210 describes computer resources available in simplified business terms. In service catalog 1210, CPU GHz and MB RAM represent an industry standard workload that is performed by CPU and RAM. Businesses are informed by service catalog 1210 of the cost to utilize resources at a particular tier and the price they will be billed for the workload performed. In addition, businesses are informed by service catalog 1210 of the cost to enable Fast Pass performance boosting options.

Refer to the example embodiments of FIG. 13 and FIG. 11. FIG. 13 is a simplified illustration of an invoice. Billing module 1140 collects information 1320 on resources allocated by virtualization platform 1180 for consumption by Virtual Computer 1130. Billing module 1140 produces itemized cost 1340 according to billing schedule 1330. Billing module 1140 produces invoice 1310 showing itemized cost 1340 of resources as well as the total cost of resources. In many embodiments, invoices may be produced at various frequencies, such as hourly, daily, monthly, seasonally, or yearly. In other embodiments, invoices may be produced on a per application basis.

The methods and apparatus of this invention may take the form, at least partially, of program code (i.e., instructions) embodied in tangible non-transitory media, such as floppy diskettes, CD-ROMs, hard drives, random access or read only-memory, or any other machine- readable storage medium.

Figure 14:
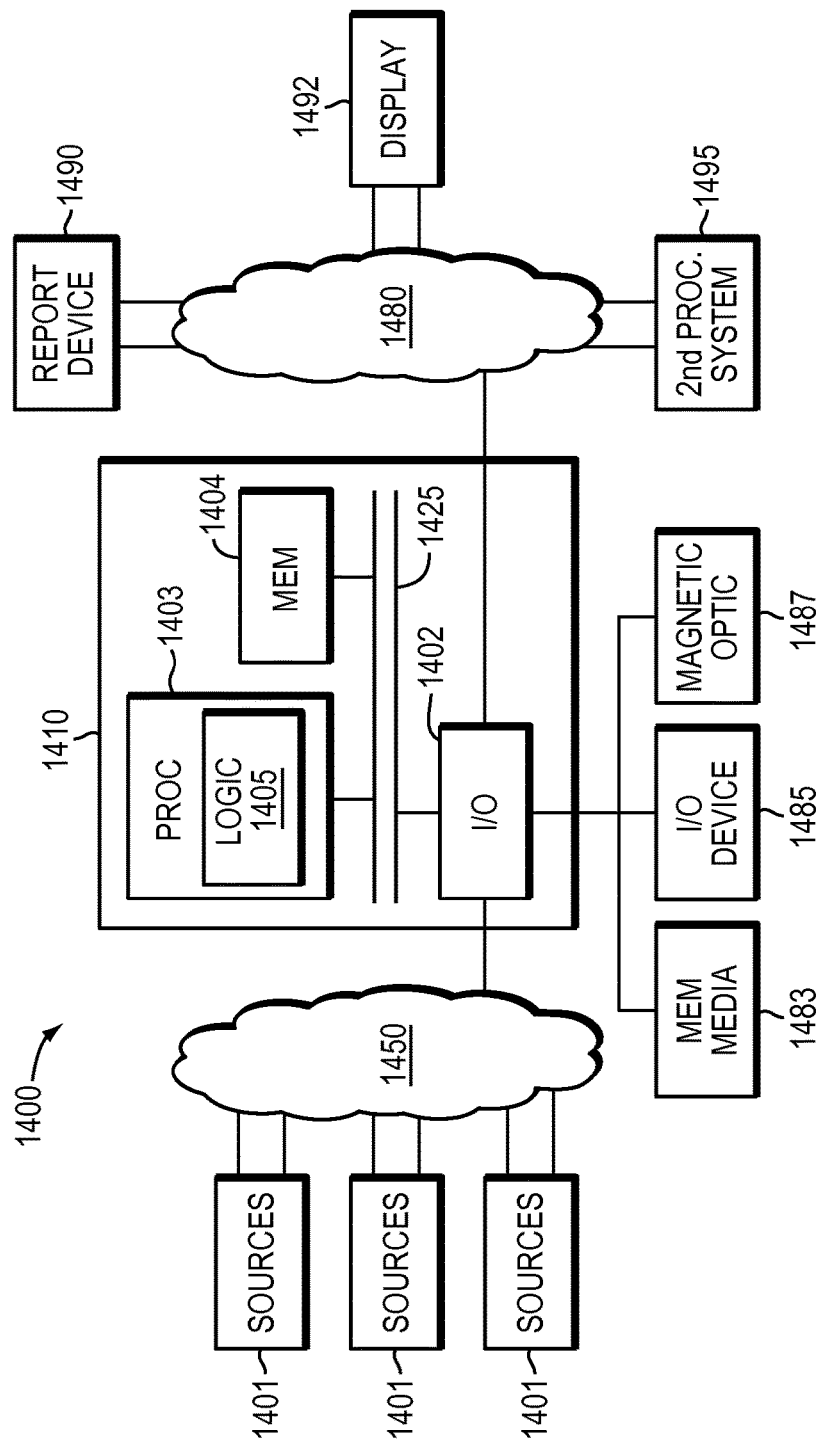
FIG. 14 is an example of an embodiment of an apparatus that may utilize the techniques described herein, in accordance with an embodiment of the present disclosure.

FIG. 14 is a block diagram illustrating an apparatus, such as a computer 1410 in a network 1400, which may utilize the techniques described herein according to an example embodiment of the present invention. The computer 1410 may include one or more I/O ports 1402, a processor 1403, and memory 1404, all of which may be connected by an interconnect 1425, such as a bus. The computer 1410 may include Report Device 1490, connections 1450, 1480, Sources 1401, Display 1492, and 2nd Processor System 1495. Processor 1403 may include program logic 1405. The I/O port 1402 may provide connectivity to memory media 1483, I/O devices 1485, and drives 1487, such as magnetic or optical drives. When the program code is loaded into memory 1404 and executed by the computer 1410, the machine becomes an apparatus for practicing the invention. When implemented on one or more general-purpose processors 1403, the program code combines with such a processor to provide a unique apparatus that operates analogously to specific logic circuits. As such, a general purpose digital machine can be transformed into a special purpose digital machine.

Figure 15:
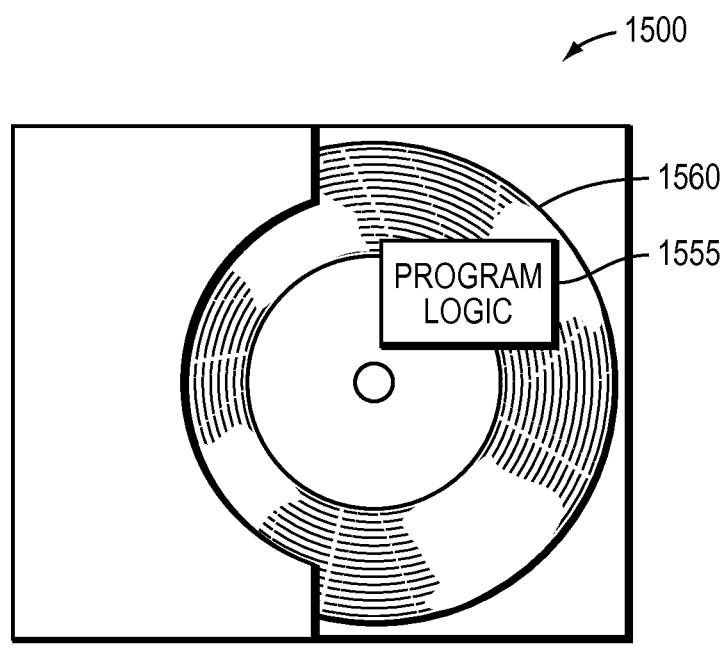
FIG. 15 is an example of a method embodied on a computer readable storage medium that may utilize the techniques described herein, in accordance with an embodiment of the present disclosure.

FIG. 15 is a block diagram illustrating a method embodied on a computer readable storage medium 1560 that may utilize the techniques described herein according to an example embodiment of the present invention. FIG. 15 shows Program Logic 1555 embodied on a computer-readable medium 1560 as shown, and wherein the Logic is encoded in computer-executable code configured for carrying out the methods of this invention and thereby forming a Computer Program Product 1500. Program Logic 1555 may be the same logic 1405 on memory 1404 loaded on processor 1403 in FIG. 14. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIG. 5. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced. Accordingly, the present implementations are to be considered as illustrative and not restrictive.

What is claimed is:

1. A system comprising:
a set of physical resources;
a virtualization layer, comprising a set of virtual resources and a virtualization platform; wherein the set of virtual resources is mapped by the virtualization layer to the set of physical resources; wherein the set of virtual resources is grouped into a plurality of distinct tiers, each respective tier having a respective performance level that differentiates the respective tier from the other tiers in the plurality of tiers, wherein each respective performance level is based on at least one respective performance characteristic of the virtual resources associated with the respective tier; and wherein the virtualization platform is configured to allocate at least one or more respective portions of one or more respective tiers to provide respective virtual resources assigned to the one or more respective tiers to be consumed by one or more virtual machines to execute one or more applications, each of the one or more respective portions having a respective allocation size corresponding to a percent of the total respective virtual resources available at the respective tier that are allocated to the one or more virtual machines;
a set of policies configured to dynamically control and vary each respective allocation size based at least in part on at least one of user input and real-time monitoring of resource usage of the one or more applications; and
computer-executable logic configured to enable one or more processors to execute:
monitoring real-time resource requirements of the one or more applications; wherein the one or more virtual machines execute the one or more applications using the virtual resources allocated to the one or more virtual machines via the allocated respective portions of the tiers;
making a determination, based at least in part on the monitoring and on at least one policy in the set of policies, whether to change any one or more of the respective allocation sizes, such that the one or more virtual machines executing the one or more applications are allocated a different percent of the respective resources associated with one or more of the respective tiers as compared to the percent associated with an existing allocation size; and
based at least in part on a positive determination, changing the allocation size, dynamically and in real-time, so as to provide the one or more virtual machines executing the one or more applications with a greater or lesser percent of the total virtual resources associated with a given respective tier.

2. The system of claim 1, wherein the physical resources of the system comprise at least one of computers, networking devices, and database servers.

3. The system of claim 1, wherein the one or more computer resources of the system comprise at least one of: a central processor unit (CPU) count, CPU speed, a number of operations processed by a CPU, a random access memory (RAM) subsystem size, number of memory transactions processed by a RAM, cost to perform a number of processor operations, cost to perform a number of memory transactions: and a performance boost.

4. The system of claim 1, wherein the set of policies comprise one or more policies relating to allocation of virtual resources to dynamically implement a Fast Pass performance boost for a given one or more tiers, if a Fast Pass performance boost option is enabled in one or more policies applicable to the one or more given tiers;
wherein the Fast Pass performance boost is configured to dynamically provide designated Fast Pass resources to the given tier, wherein provision of the designated Fast Pass resources is configured to increase overall performance of one or more virtual machines allocated to the given tier.

5. The system of claim 4, wherein providing the designated Fast Pass resources comprises providing computer-executable logic enabling the one or more processors to utilize technology to perform at least one or more of the following actions:
(a) increase overall performance of compute resources;
(b) increase overall performance of compute resources by a selectable amount;
(c) increase overall performance of at least one underlying infrastructure that underlies one or more of the compute resources, the underlying infrastructure comprising one or more of a clock frequency, a core, an interconnect transfer, and a memory;
(d) allocate one or more Fast Pass resources to a workload of at least one of the one or more virtual machines;
(e) alter the allocation of the set of virtualized resources so as to provide a performance boost to the given tier that has the Fast Pass option enabled; and
(f) performing any one or more of (a) through (e) during one or more predetermined time periods.

6. The system of claim 1, wherein the computer-executable program logic is further configured to enable one or more processors to execute at least one of:
collecting information on the set of virtual resources allocated via the dynamically controlled allocated respective portions of the one or more respective tiers; and billing a customer according to the set of virtual resources allocated; and
allocating computer resources using a service catalog, wherein the service catalog describes the resources in business terms.

7. The system of claim 1, wherein the computer-executable program logic is further configured to enable one or more processors to execute:
allocating less than the full capability of the physical resources associated with the respective one or more tiers to be consumed by the one or more applications.

8. The system of claim 1, wherein the one or more applications are allocated a first respective portion of a first tier having a first performance level and wherein the computer-executable logic is further configured to enable the one or more processors to execute:
making a determination, based at least in part on monitoring real-time resource requirements of the one or more applications, whether to allocate additional virtual resources to the one or more applications by allocating a second respective portion of virtual resources assigned to a second tier having a second performance level different than the first performance level; and
based at least in part on a positive determination, allocating the second respective portion of virtual resources from the second tier, to the one or more applications.

9. The system of claim 1, wherein the at least one performance characteristic comprises a performance feature comprising at least one of clock frequency, cores, interconnect transfers, memory module clock speed, central processor unit (CPU) count, CPU speed, random access memory (RAM) size.

10. A computer program product comprising:
a non-transitory computer readable storage medium encoded with computer executable program code that when executed on one or more processors of a computer causes the computer to operate a virtualized system, the computer program product comprising:
computer program code for implementing a virtualization layer, comprising a set of virtual resources and a virtualization platform, wherein the set of virtualized resource are mapped by the virtualization layer to a set of physical resources;
computer program code for grouping the set of virtualized resources into a plurality of distinct tiers, each respective tier having a respective performance level that differentiates the respective tier from the other tiers in the plurality of tiers, wherein each respective performance level is based on at least one respective performance characteristic of the virtual resources associated with the respective tier, and wherein the virtualization platform is configured to allocate at least one or more respective portions of one or more respective tiers to provide respective virtual resources assigned to the one or more respective tiers to be consumed by or more virtual machines to execute one or more applications, each of the one or more respective portions having a respective allocation size corresponding to a percent of the total respective virtual resources available at the respective tier that are allocated to the one or more virtual machines;
computer program code for implementing a set of policies configured to dynamically control and vary each respective allocation size based at least in part on at least one of user input and real-time monitoring of resource usage of the one or more applications;
computer program code for monitoring real-time resource requirements of the one or more applications; wherein the one or more virtual machines execute the one or more applications using the virtual resources allocated to one or more virtual machines via the allocated respective portions of the tiers;
computer program code for making a determination based at least in part on the monitoring and on at least one policy in the set of policies, whether to change any one or more of the respective allocation sizes, such that the one or more virtual machines executing the one or more applications are allocated a different percent of the respective resources associated with one or more of the respective tiers as compared to the percent associated with an existing allocation size; and
based at least in part on a positive determination, changing the allocation size, dynamically and in real-time, so as to provide the one or more virtual machines executing the one or more applications with a greater or lesser percent of the total virtual resources associated with a given respective tier.

11. The computer program product of claim 10, further comprising computer program code for enabling allocation of at least one of computer resources, networking resources, and database resources, to the one or more applications.

12. The computer program product of 10, further comprising computer program code for dynamically implementing a Fast Pass performance boost for a given tier, if a Fast Pass performance boost option is enabled in one or more policies applicable to the given tier;
wherein the Fast Pass performance boost is configured to dynamically provide designated Fast Pass resources to the given tier, wherein provision of the designated Fast Pass resources is configured to increase overall performance of one or more virtual machines allocated to the given tier.

13. The system of claim 12, where the computer program code for dynamically implementing the Fast Pass performance boost further comprises computer program code for utilizing technology to perform at least one or more of the following actions:
(a) increase overall performance of compute resources;
(b) increase overall performance of compute resources by a selectable amount;
(c) increase overall performance of at least one underlying infrastructure that underlies one or more of the compute resources, the underlying infrastructure comprising one or more of a clock frequency, a core, an interconnect transfer, and a memory;
(d) allocate one or more Fast Pass resources to a workload of at least one of the one or more virtual machines;
(e) alter the allocation of the set of virtualized resources so as to provide a performance boost to the given tier that has the Fast Pass option enabled; and
(f) performing any one or more of (a) through (e) during one or more predetermined time periods.

14. The computer program product of 10, further comprising at least one of:
computer program code for collecting information on the set of virtual resources allocated via the dynamically controlled allocated respective portions of the one or more respective tiers and billing a customer according to the set of virtual resources allocated; and
computer program code for allocating computer resources using a service catalog, wherein the service catalog describes the resources in business terms.

15. The computer program product of 10, further comprising computer program code for:
allocating less than the full capability of the physical resources associated the respective one or more tiers to be consumed by the set of one or more applications.

16. A computer-executable method for allocating virtual resources to one or more virtual machines running an application, wherein the virtual resources are mapped to a set of physical resources and are grouped into distinct tiers, each respective tier having a respective performance level that differentiates the respective tier from the other tiers in the plurality of tiers, wherein each respective performance level is based on at least one performance characteristic of the virtualized resources associated with the respective tier, the computer-executable method comprising:
allocating at least one or more respective portions of one or more respective tiers to provide respective virtual resources assigned to the one or more respective tiers to be consumed by one or more virtual machines to execute one or more applications, each of the one or more respective portions having a respective allocation size corresponding to a percent of the total respective virtual resources available at the respective tier that are allocated to the one or more virtual machines;
defining a set of policies configured to dynamically control and vary each respective allocation size based at least in part on at least one of user input and real-time monitoring of resource usage of the one or more applications;

monitoring real-time resource requirements of the one or more applications, wherein the one or more virtual machines execute the one or more applications using the virtual resources allocated to the one or more virtual machines via the allocated respective portions of the tiers;

making a determination, based at least in part on the monitoring and on at least one policy in the set of policies, whether to change any one or more of the respective allocation sizes, such that the one or more virtual machines executing the one or more applications are allocates a different percent of the respective resources associated with one or more of the respective tiers as compared to the percent associated with an existing allocation size; and based at least in part on a positive determination, changing the allocation size, dynamically and in real-time, so as to provide the one or more virtual machines executing the one or more applications with a greater or lesser percent of the total virtual resources associated with a given respective tier.

17. The computer-executable method of claim 16, further comprising at least one of:
allocating resources using a service catalog that describes the resources in business terms;
collecting information on resources allocated; and
billing a customer according to the resources allocated.

18. The computer-executable method of claim 16, further comprising:
allocating less than the full capability of the physical resources associated with the respective one or more tiers to be consumed by the set of applications.

19. The computer-executable method of claim 16, further comprising:
providing, in the set of policies, one or more policies relating to allocation of virtual resources to dynamically implement a Fast Pass performance boost for a given tier, if a Fast Pass performance boost option is enabled in one or more policies applicable to the given tier;
wherein the Fast Pass performance boost is configured to dynamically provide designated Fast Pass resources to the given tier, wherein provision of the designated Fast Pass resources is configured to increase overall performance of one or more virtual machines allocated to the given tier.

20. The computer-executable method of claim 19, wherein the computer-executable method further comprises providing designated Fast Pass resources by using technology to perform at least one or more of the following actions:
(a) increasing overall performance of compute resources;
(b) increasing overall performance of compute resources by a selectable amount;
(c) increasing overall performance of at least one underlying infrastructure that underlies one or more of the compute resources, the underlying infrastructure comprising one or more of a clock frequency, a core, an interconnect transfer, and a memory;
(d) allocating one or more Fast Pass resources to a workload of a virtual machine;
(e) altering the allocation of the set of virtualized resources so as to provide a performance boost to the given tier that has the Fast Pass option enabled; and
(f) performing any one or more of (a) through (e) during one or more predetermined time periods.

* * * * *